(12) United States Patent
Oeuvrard et al.

(10) Patent No.: US 8,939,489 B2
(45) Date of Patent: Jan. 27, 2015

(54) MOTOR VEHICLE INTERIOR TRIM, DASHBOARD AND VEHICLE COMPRISING SUCH A TRIM

(75) Inventors: Jean-François Oeuvrard, Cergy Pontoise (FR); Pierre Goix, Le Mesnil Theribus (FR)

(73) Assignee: Faurecia Interieur Industrie, Nanterre (FR)

( * ) Notice: Subject to any disclaimer, the term of this patent is extended or adjusted under 35 U.S.C. 154(b) by 182 days.

(21) Appl. No.: 13/641,604

(22) PCT Filed: Apr. 12, 2011

(86) PCT No.: PCT/FR2011/050829
§ 371 (c)(1),
(2), (4) Date: Sep. 24, 2013

(87) PCT Pub. No.: WO2011/128572
PCT Pub. Date: Oct. 20, 2011

(65) Prior Publication Data
US 2014/0054919 A1   Feb. 27, 2014

(30) Foreign Application Priority Data
Apr. 16, 2010 (FR) .................................... 10 52927

(51) Int. Cl.
B62D 39/00 (2006.01)
B60R 13/02 (2006.01)
B60K 37/06 (2006.01)
H01H 13/06 (2006.01)
H01H 13/14 (2006.01)

(52) U.S. Cl.
CPC ............. *B60R 13/0256* (2013.01); *B60K 37/06* (2013.01); *H01H 13/06* (2013.01); *H01H 13/14* (2013.01); *B60K 2350/1008* (2013.01); *B60K 2350/2043* (2013.01); *B60K 2350/941* (2013.01); *B60K 2350/946* (2013.01); *B60R 2013/0287* (2013.01); *B60Y 2410/113* (2013.01)
USPC ........................................................ 296/1.08

(58) Field of Classification Search
CPC ......... B60R 13/02; H01H 13/06; H01H 13/14
USPC ................................................. 296/1.08, 75
See application file for complete search history.

(56) References Cited

U.S. PATENT DOCUMENTS

| | | | |
|---|---|---|---|
| 2008/0012382 A1 | 1/2008 | Evans | |
| 2009/0056230 A1* | 3/2009 | Flendrig | 49/502 |
| 2010/0213730 A1* | 8/2010 | Biggs et al. | 296/1.08 |

FOREIGN PATENT DOCUMENTS

| | | |
|---|---|---|
| DE | 19708064 | 9/1998 |
| DE | 10237719 | 2/2004 |
| FR | 2923177 | 5/2009 |
| FR | 2947220 | 12/2010 |
| FR | 2947221 | 12/2010 |
| JP | 10296757 | 11/1998 |

OTHER PUBLICATIONS

International Search Report for PCT/FR2011/050829 dated Jul. 20, 2011, 4 pages.

* cited by examiner

*Primary Examiner* — Lori L Lyjak
(74) *Attorney, Agent, or Firm* — Reising Ethington P.C.

(57) ABSTRACT

A motor vehicle trim includes a multilayer panel having a support and an appearance skin covering the support. The trim includes a hole crossing through the panel, a switch positioned in the hole, and a plug for closing the hole and covering the switch. The plug allows actuation of the switch through the plug and is removably mounted on the skin by mating attachment reliefs provided on the plug and the skin.

14 Claims, 5 Drawing Sheets

MOTOR VEHICLE INTERIOR TRIM, DASHBOARD AND VEHICLE COMPRISING SUCH A TRIM

TECHNICAL FIELD

The present invention relates to a motor vehicle interior trim of the type comprising a multilayer panel having at least one support and an appearance skin covering the support, the trim comprising a hole crossing through the panel, a switch positioned in the hole and a plug for closing the hole covering the switch, the plug allows actuation of the switch through the plug.

BACKGROUND

FR 2 923 177 discloses a motor vehicle interior trim of the aforementioned type, in which the skin is thermoformed on the plug so as to adhere to the latter. Nevertheless, such a trim does not allow easy maintenance and at a reduced cost.

An object of the invention is to propose a motor vehicle interior trim for which maintenance is easier and less costly.

SUMMARY

For this purpose, the invention proposes a motor vehicle interior trim of the aforementioned type, characterized in that the plug is attached on the skin by means of snap-on fastening with mating attachment reliefs, provided on the plug and the skin so that the plug is removably mounted on the skin.

According to other embodiments, the trim comprises one or more of the following features, taken individually or according all technically possible combinations:
- the panel comprises a flexible intermediate layer between the rigid support and the flexible skin;
- the skin comprises an edge defining at the periphery of the hole a ring-shaped clearance space for receiving the plug;
- the attachment reliefs are provided on an internal surface of the clearance space and on an external surface of the plug;
- the clearance space comprises at least one ring-shaped relief made on an axial span of the clearance space extending along the axis of the hole;
- the clearance space is staged and comprises at least two axial spans extending along the axis of the hole connected through a radial shoulder;
- the plug comprises a ring-shaped peripheral portion for attaching the plug on the skin and a flexible membrane extending through the peripheral portion, at least one attachment relief being provided on the peripheral portion;
- the plug is in one piece;
- the plug comprises a peripheral portion formed by a rigid ring and a flexible membrane added onto the ring, notably by overmolding of the membrane on the ring;
- the trim comprises sealing means between the skin and the support at the periphery of the hole;
- the sealing means comprise a sealing lip made with the plug in the same material and connected to the latter through a frangible area intended to break upon taking off the plug; and
- the sealing means comprise a ring-shaped gasket added between the skin and the support at the periphery of the hole.

The invention also relates to a dashboard and to a motor vehicle comprising a trim as defined above.

BRIEF DESCRIPTION OF THE DRAWINGS

The invention and its advantages will be better understood upon reading the description which follows, only given as an example and made with reference to the appended drawings, wherein.

DETAILED DESCRIPTION OF THE ILLUSTRATED EMBODIMENTS

Figure 1:
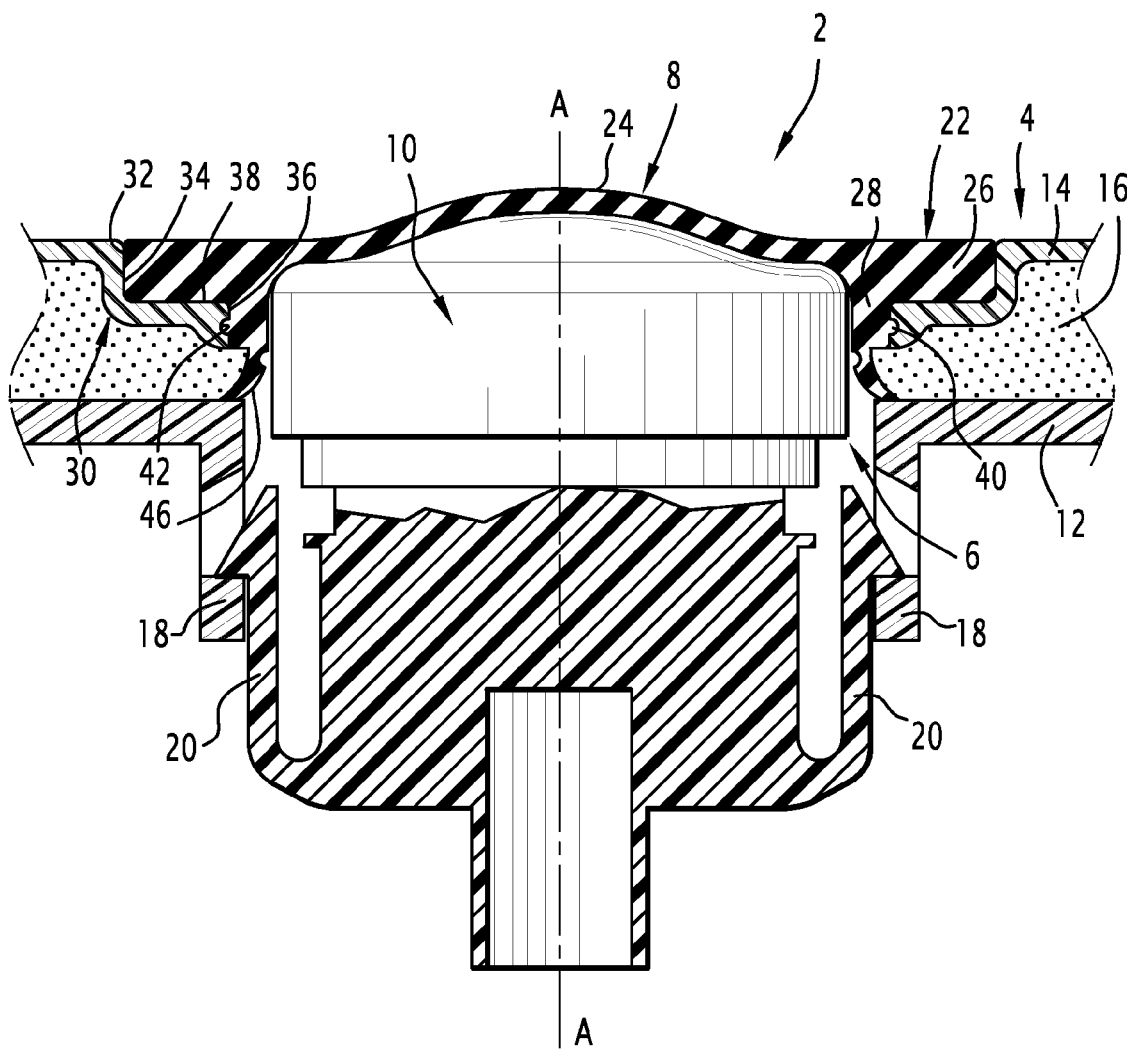
FIG. 1 is a sectional view of a motor vehicle interior trim according to a first embodiment of the invention.

The motor vehicle interior trim 2 illustrated in FIG. 1 is intended to be placed inside the passenger compartment of the motor vehicle. For example, this is a dashboard trim.

The trim 2 comprises a panel 4, a hole 6 crossing through the panel 4 along an axis A, a plug 8 closing the hole 6 and a switch 10 attached on the panel 4 inside the hole 6, while being covered by the plug 8 on the side of the visible front face of the panel 4 and actuatable through this plug 8.

The switch 10 is connected to a control unit of a functional member of the motor vehicle. The switch 10 is for example a off/on switch for starting the motor vehicle. The switch 10 may be an electromechanical switch with a mobile control member. Alternatively, the switch 10 may be of another type, for example a capacitive switch without any mobile member.

The panel 4 is a multilayer panel. It comprises, superposed, a support 12 and an appearance skin 14 covering the support 12. In the illustrated embodiment, the panel 4 further comprises a flexible intermediate layer 16 positioned between the rigid support 12 and the flexible skin 14.

The support 12 gives the panel 4 its general curve. The skin 14 is the visible layer of the panel 4. The intermediate layer 16 gives a soft touch to the panel 4, the skin 14 may be pressed down upon touching it by compression of the intermediate layer 16.

The skin 14 is made in a thin sheet of plastic or natural material, for example a textile layer in synthetic and/or natural fibers, or leather. The intermediate layer 16 may consist of a foam or of a gel, for example a polyurethane foam. The support 12 for example consists of a rigid plastic optionally reinforced with fibers.

The support 12 comprises at the periphery of the hole 6 pierced lugs 18 provided for cooperating with elastic hooks 20 of the switch 10 for removably attaching the switch 10 onto the support 12 by snap-on fastening. The lugs 18 protrude on the side of the rear face of the panel 4 opposite to the skin 14.

The plug 8 is attached on the skin 14 by means of mating attachment reliefs provided on the plug 8 and the skin 14 so that the plug 8 may be taken off from the skin 14. As this is visible in the figures, the plug 8 is a distinct part of the switch 10. The plug 8 may therefore be removed without removing the switch 10 and thus it is possible to control the operation of the switch 10 in situ. Moreover, the switch 10 may be a standard element, the appearance of which does not alter that of the trim.

The plug 8 comprises a ring-shaped peripheral portion 22 for attachment on the skin 14 and a shut-off membrane 24 extending through the peripheral portion 22. The peripheral portion 22 is provided for ensuring attachment of the plug 8 on the skin 14, and the membrane 24 is provided for extending transversely through the hole 6.

The membrane 24 is flexible and allows actuation of the switch 10 through the latter. The peripheral portion 22 is more rigid so as to ensure efficient attachment of the plug 8 on the skin 14.

In the example illustrated in FIG. 1, the plug 8 is in one piece. The membrane 24 is made with the peripheral portion 22 in the same material. The membrane 24 is thinner in order to have greater flexibility than the peripheral portion 22 which is thicker.

The peripheral portion 22 comprises a ring-shaped flange 26 and a tubular sleeve 28 extending axially along the A axis from the internal edge of the flange 26.

The skin 14 comprises at the periphery of the hole 6 an edge 30 retracting towards the inside of the panel 4 in the direction of the support 12. The edge 30 is conformed so as to define around the hole 6, on the front face of the skin 6 opposite to the support 12, a ring-shaped clearance space 22 mating the peripheral portion 22 of the plug 8.

In the illustrated example, the clearance space 32 is staged with decreasing diameter towards the support 12. The clearance space 32 comprises a first axial span 34 of large diameter and a second axial span 36 of small diameter extending along the A axis of the hole 6 connected through a radial shoulder 38.

The first span 34 has an inner diameter substantially equal to the outer diameter of the flange 26 of the peripheral portion 22 of the plug 8. The second span 36 has an inner diameter substantially equal to the outer diameter of the sleeve 28.

When the plug 8 is inserted into the hole 6, the peripheral portion 22 of the plug 8 is received into the clearance space 32, bearing against the shoulder 38, the flange 26 being received in the segment defined by the first span 34, and the sleeve 28 being engaged into the segment defined by the second span 36.

Preferably, the plug 8 is flush with the front face of the skin 14 at the periphery of the clearance space 32.

The plug 8 and the skin 14 are provided with mating attachment reliefs allowing the plug 8 to be removably attached on the skin 14 by snap-on fastening.

In the illustrated example, the plug 8 comprises an attachment relief in the form of a ring-shaped rib 40, provided here on the external surface of the sleeve 28, and the skin 14 comprises a ring-shaped groove 42 mating the ring-shaped rib 40, provided here on the second span 36 of the clearance space 32. Alternatively, a rib may be provided on the skin 14 and a mating groove on the plug 8. As an option, it is possible to provide several pairs of mating reliefs, for example by providing several mating rib and groove pairs.

Advantageously, the trim 2 comprises sealing means for ensuring the seal between the skin 14 and the support 12 at the periphery of the hole 6.

Figure 2:
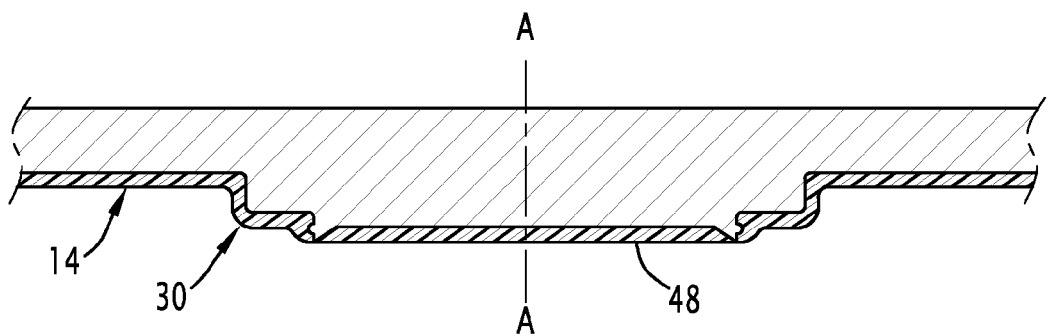
FIGS. 2 to 5 are views similar to that of FIG. 1 illustrating successive steps in the manufacturing of the interior trim of FIG. 1.

In the example illustrated in FIGS. 1 and 2, the sealing means comprise a sealing lip 46 axially extending the sleeve 28 so as to come into contact with the front face of the support 12 turned towards the skin 14.

In the example illustrated in FIG. 1, the lip 46 is made with the plug 8 in the same material. It is connected to the sleeve 28 through a frangible area, here in the form of a bridge of material with reduced thickness relatively to that of the sleeve 28 and of the base of the lip 46.

The steps of a method for manufacturing the trim 2 are illustrated in FIGS. 2 to 5.

In a first step illustrated in FIG. 2, the skin 14 is made for example by thermoforming a film in thermoplastic material on a matrix having a shape corresponding to the desired one for the skin 14. The skin 14 is formed with an edge blank 30 closed by a cap 48. The skin 14 is alternatively obtained by rotation molding or by any other suitable method. At the same time, the plug 8 is provided for example by molding of synthetic material, for example silicone.

Figure 3:
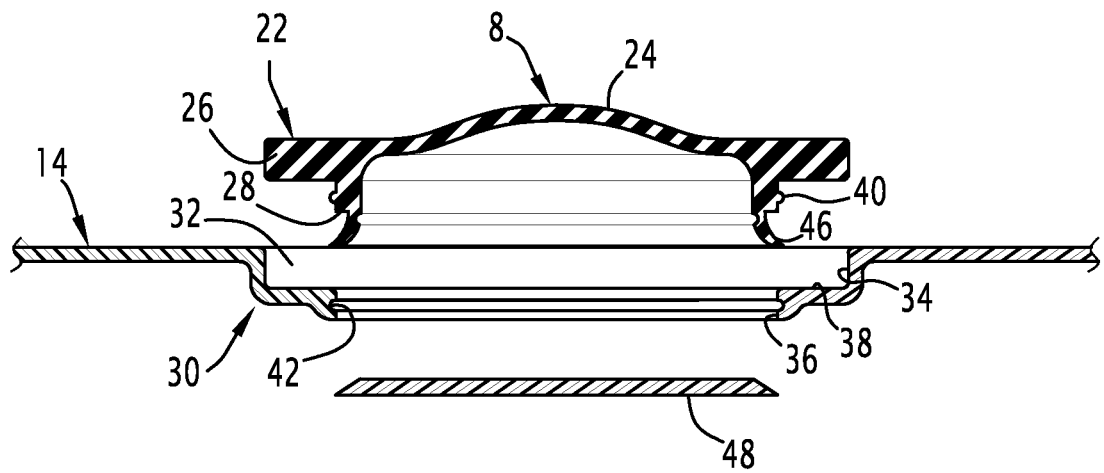
Figure 4:
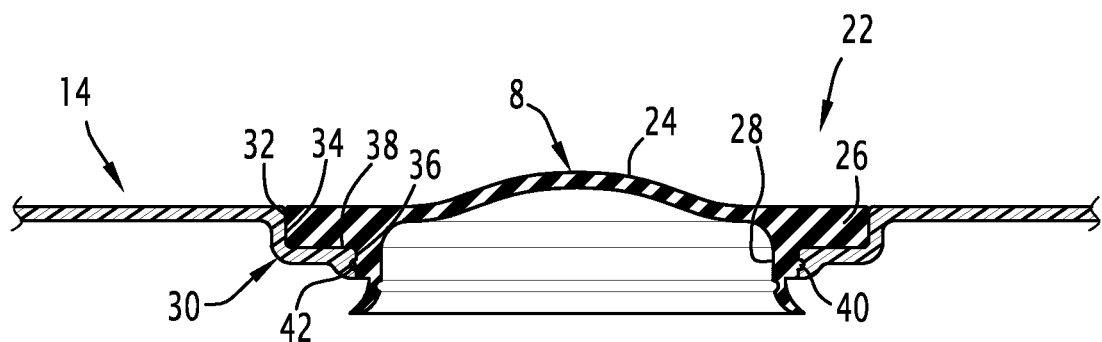

In a second step illustrated in FIGS. 3 and 4, the cap 48 is removed for example by cutting it out and then the plug 8 is attached on the skin 14 by forcibly inserting it into the clearance space 32 and by snap-on fastening of the mating reliefs (rib 40 and groove 42) provided on the plug 8 and the skin 14.

Figure 5:
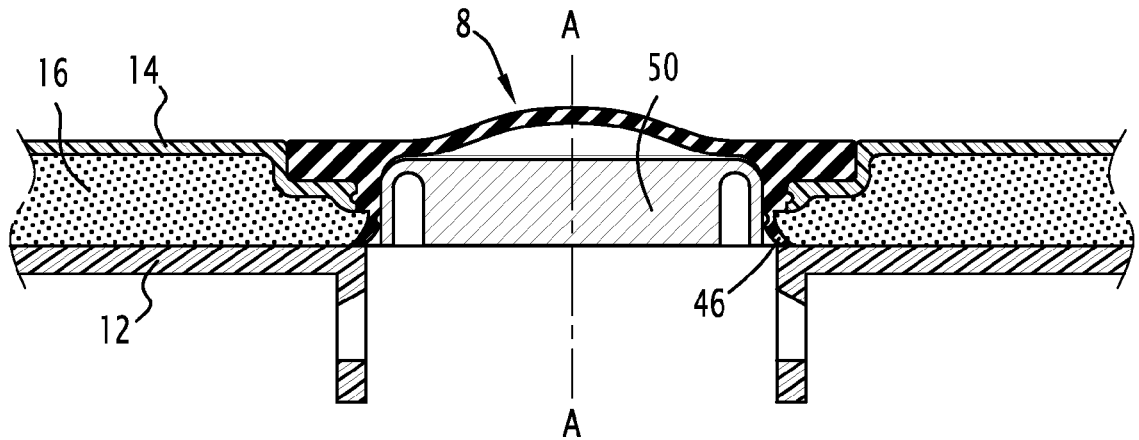
Figure 6:
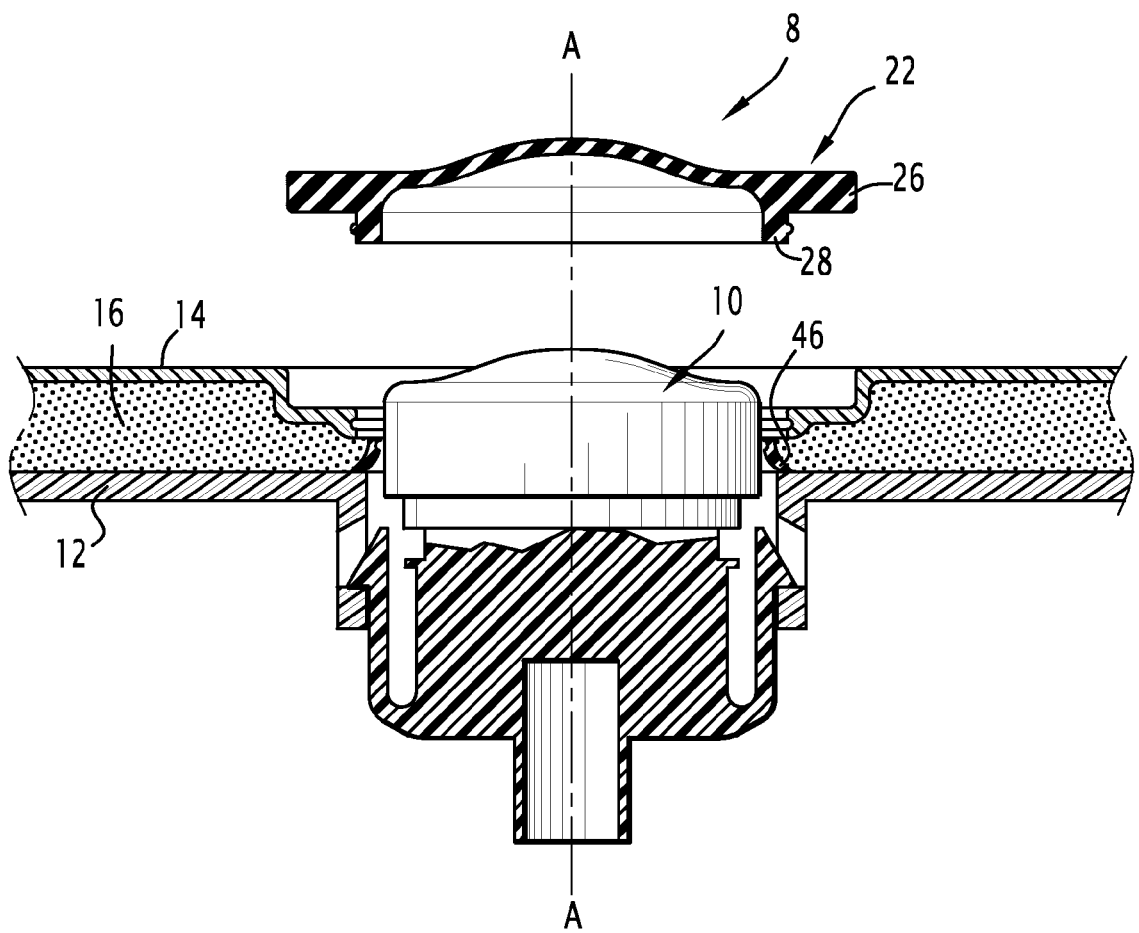
FIG. 6 is a view similar to that of FIG. 1 illustrating the taking off of a plug of the interior trim.

In a third step illustrated in FIG. 5, the skin 14 provided with the plug 8 and the support 12 is placed in a mold so as to form a molding cavity between the support 12 and the skin 14, and then material is injected between the support 12 and the skin 14 so as to obtain the intermediate layer 16.

During the injection, the lip 46 sealably closes the sidewall of the hole 6, imperviously towards the injected material, and prevents leaking of the injected material outwards.

Optionally, and as illustrated in FIG. 5, a rigid insert 50 is placed inside the hole 6 under the plug 8 during the injection, the insert 50 being provided for supporting the lip 46 and preventing a movement of the latter towards the inside of the hole 6. Thus, it is avoided that the high pressure of the injected material causes the lip 46 to turn over and the injected material to pass into the hole 6.

In a following step, the switch 10 is snap-on fastened onto the support 12, under the plug 8. The result is the trim of FIG. 1.

The plug 8 may be simply taken off by pulling it for extracting it from the skin 14. Taking off the plug 8 causes snap-on unfastening of the mating attachment reliefs (rib 40 and groove 42).

The lip 46 may be stuck with the intermediate layer 16. Nevertheless the frangible area easily breaks which allows the plug 8 to be easily taken off.

A new plug similar to the plug 8 but without any sealing lip 46 may then be inserted and attached on the skin 12 simply and solely by snap-on fastening thereby ensuring secure and removable attachment.

Figure 7:
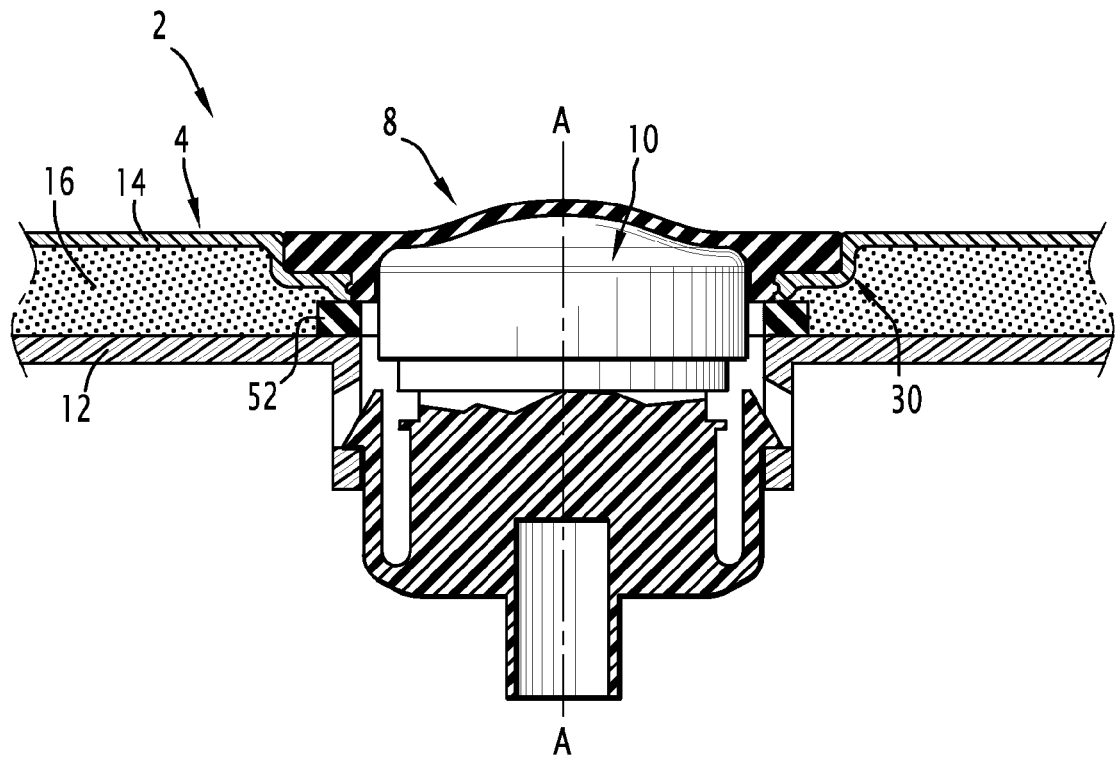
FIGS. 7 and 8 are views similar to that of FIG. 1 illustrating interior trims according to the second and third embodiments of the invention.

In the second embodiment illustrated in FIG. 7, the plug 8 is without any sealing lip. The sealing means comprise a ring-shaped gasket 52 added on between the edge 30 of the skin 14 and the support 12.

Figure 8:
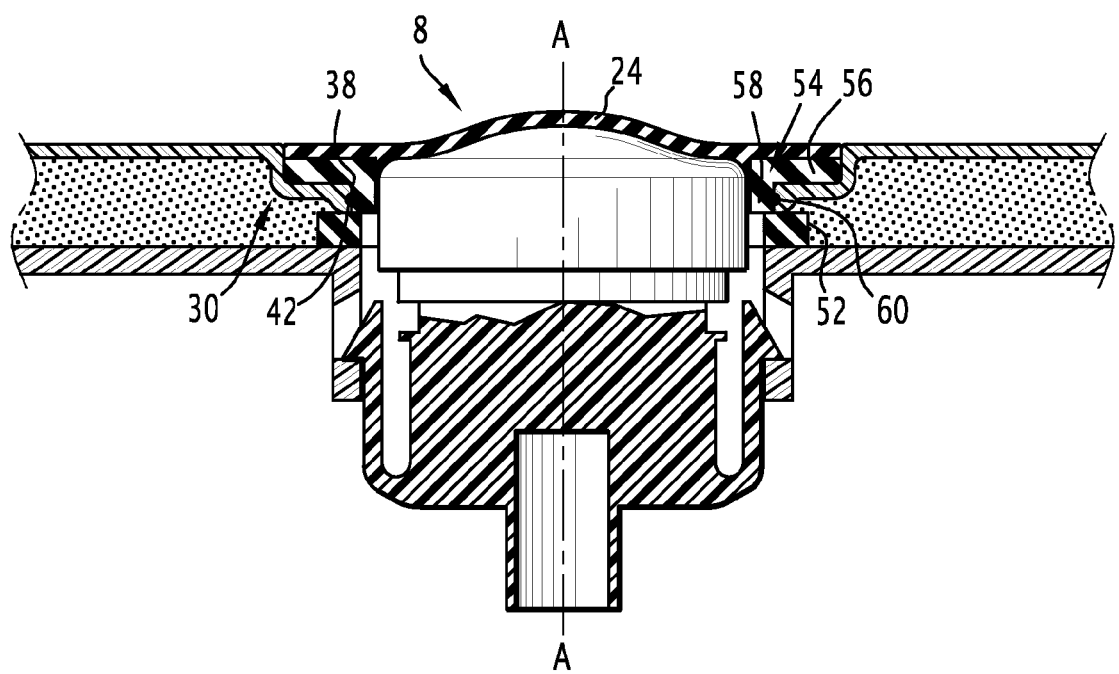

In the third embodiment illustrated in FIG. 8, the plug 8 is composite. It comprises an attachment ring 54 made in a first rigid material and a membrane 24 added onto the ring 54 and made in a second material which is less rigid than the first material, for example in silicone.

The ring 54 has an L-section and comprises a radial flange 56 and a tubular sleeve 58 extending axially from the internal edge of the flange 56. The sleeve is provided on its external surface with a ring-shaped rib 60.

Thus, the ring 54 allows attachment of the plug 8 in the clearance space 32 defined by the edge 30, by snap-on fastening of the rib 60 in the groove 42 of the second span 38. Of course, here also, the positions of the groove 42 and of the rib 60 may alternatively be inverted.

The rigid ring 54 ensures secure attachment of the plug, while the flexible membrane 24 allows easy actuation of the switch 10.

The membrane 24 is advantageously overmolded on the ring 54. In a possible embodiment, the ring 54 is in a rigid plastic material and the membrane 24 is in silicone.

Figure 9:
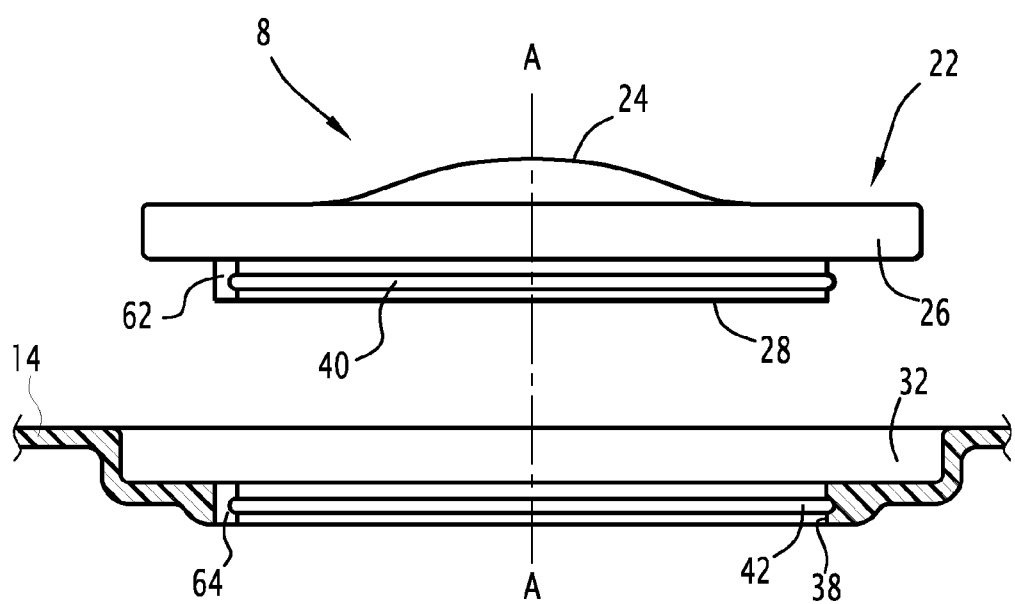
FIG. 9 is a detailed view of a skin and of a plug of a trim according to an alternative embodiment.

In the alternative of the first embodiment illustrated in FIG. 9, the plug 8 and the skin 14 are advantageously provided with angular indexation means with which the snap-on fastening of the plug 8 on the skin 14 may be ensured in a determined angular position around the axis A of the hole 6, for example in order to ensure adequate orientation of a pictogram borne by the plug 8 on the visible front face of its membrane 24.

In the illustrated example, the angular indexation means appear as an axial rib 62 provided on the sleeve 28 of the plug 8, and a mating axial groove 64 provided in the second span 36 of the edge 30.

It is possible to provide one or several pairs of ribs and grooves, distributed around the axis A so as to impose a determined angular position.

The attachment of the plug 8 on the skin 14 by simple snap-on fastening gives the possibility of easily placing the plug 8 in the proper angular orientation.

Of course, this alternative is adapted to the case of a one-piece plug such as in the embodiments of FIGS. 1 and 7, and to that of a composite plug such as in the embodiment of FIG. 8.

By means of the invention, a motor vehicle interior trim is obtained comprising a hole for inserting a switch closed by a plug removably mounted on the skin by means of snap-on fastening of mating attachment reliefs so that the plug may be taken off from the skin without deteriorating the skin 8. The plug 8 may be taken off and easily replaced while allowing a trim to be obtained, which has satisfactory quality and a low manufacturing cost.

The invention applies to dashboard trims and more generally to any interior trim of a motor vehicle, such as for example roof lining or door trims.

The invention claimed is:

1. A motor vehicle interior trim, of the type comprising a multilayer panel having at least one support and an appearance skin covering the support, the trim comprising a hole crossing through the panel, a switch positioned in the hole and a plug for closing the hole covering the switch, wherein the plug is a distinct part from the switch and allows actuation of the switch through the plug, characterized in that the plug is attached on the skin by means of snap-on fastening of mating attachment reliefs provided on the plug and the skin so that the plug is removably mounted on the skin.

2. The trim according to claim 1, wherein the panel comprises a flexible intermediate layer between the support and the skin.

3. The trim according to claim 1, wherein the skin comprises an edge defining at the periphery of the hole a ring-shaped clearance space for receiving the plug.

4. The trim according to claim 3, wherein the attachment reliefs are provided on an internal surface of the clearance space and on an external surface of the plug.

5. The trim according to claim 3, wherein the clearance space comprises at least one ring-shaped relief made on an axial span of the clearance space extending along the axis of the hole.

6. The trim according to claim 3, wherein the clearance space is staged and comprises at least two axial spans extending along the axis of the hole connected through a radial shoulder.

7. The trim according to claim 1, wherein the plug comprises a ring-shaped peripheral portion of the plug on the skin and a flexible membrane extending through the peripheral portion, at least one attachment relief being provided on the peripheral portion.

8. The trim according to claim 7, wherein the plug is in one piece.

9. The trim according to claim 7, wherein the peripheral portion comprises a rigid ring and the flexible membrane is overmolded on the ring.

10. The trim according to claim 1, characterized in that the trim includes a seal between the skin and the support at the periphery of the hole.

11. The trim according to claim 10, characterized in that the seal comprises a sealing lip made with the plug in the same material and connected to the latter through a frangible area provided in order to break when taking off the plug.

12. The trim according to claim 10, characterized in that the seal comprises a ring-shaped gasket added on between the skin and the support at the periphery of the hole.

13. A dashboard comprising a trim according to claim 1.

14. A motor vehicle comprising a trim according to claim 1.

* * * * *